Patented Dec. 18, 1923.

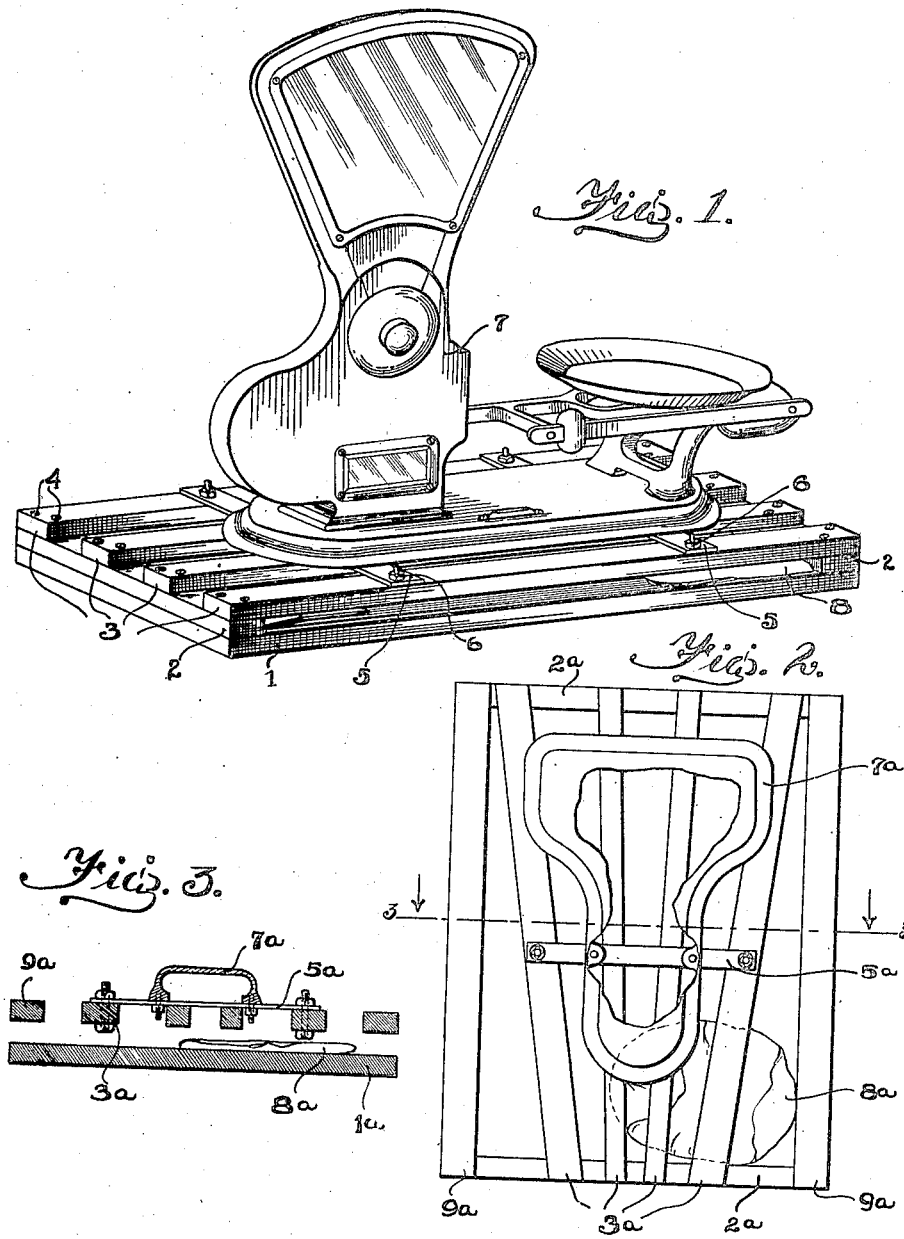

1,478,138

UNITED STATES PATENT OFFICE.

ALBERT NEILS, OF TOLEDO, OHIO, ASSIGNOR TO TOLEDO SCALE COMPANY, OF TOLEDO, OHIO, A CORPORATION OF NEW JERSEY.

MEANS FOR FASTENING ARTICLES IN PACKING CASES.

Application filed December 10, 1919. Serial No. 343,811.

*To all whom it may concern:*

Be it known that I, ALBERT NEILS, a citizen of the United States, residing at Toledo, in the county of Lucas and State of Ohio, have invented certain new and useful Improvements in Means for Fastening Articles in Packing Cases, of which the following is a specification.

This invention relates to packing cases for heavy articles and machines of somewhat fragile nature, such as weighing scales.

One of the principal objects of the invention is the provision of means for securely yet yieldably fastening an article in place in a packing case in such a way as to reduce the probability of its being injured by sudden jars such as occur when the case is roughly handled.

Another object is the provision of means to so support the article in the case that it will not lie against nor be supported by a portion of the walls of the case, which may therefore be constructed of comparatively light material.

Another object is to provide a device for resiliently fastening an article in the case which is easily and cheaply constructed and which does not involve undue enlargement of the case or radical changes in usual packing practice.

With the above and other objects in view which will readily appear as the invention is better understood, my invention consists of the novel construction, combination and arrangement of elements to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a perspective view of my improved fastening means, showing a counter scale secured thereby to the base of a packing case;

Figure 2 is a plan view of another form thereof, showing a scale base, with parts broken away, secured in position; and Figure 3 is a transverse vertical section taken substantially on the line 3—3 of Figure 2.

Referring to the drawings in detail, Figure 1 shows a solid base 1 of a packing case having a pair of blocks or cleats 2 rigidly secured at the ends of the upper face thereof. A plurality of resilient slats 3 is supported in spaced relation to the base 1 by means of the cleats 2 to which the slats are secured by means of screws 4 or equivalent fastening devices. A pair of bars 5 extends transversely of the slats 3, each of said bars being held in place by bolts 6 secured to certain of the resilient slats, and the scale or other article to be shipped is securely fastened to the bars 5 by bolts, clamps, etc. The slats 3 are made of resilient strips preferably of wood, being supported at their ends only to form a resilient platform for the scale secured upon their spaced central portions. It will be noted that the strips are free to yield to some extent laterally as well as vertically.

The space between the lower faces of the slats and the base may be utilized to house detached parts 8 of the machine. After the scale is secured to the base, the remainder of the packing case (not shown) is set over the scale and the lower portions of the walls of the case are screwed or otherwise fastened to the edges of the base 1. The upper portion of the case is thus spaced from the centrally-mounted scale, and the scale does not come into contact and is not supported by any portion of the walls no matter how the case may be turned.

The slats 3, as shown in Figure 1, are of substantially the same width and are substantially parallel, but the number and relation of the slats may, of course, be varied at will for cooperation with articles of various shapes and sizes. In Figures 2 and 3, for example, I have shown a form in which the slats 3ᵃ converge from one of the cleats 2ᵃ to the other and in which the outer slats are heavier and more substantial than the inner ones. Since the base of the scale 7ᵃ which the slats in this case are adapted to carry is wide enough at one end to be directly supported by all four of the slats, only one bar 5ᵃ is necessary. By arranging the slats in non-parallel relation they serve to assist in bracing the case, and the case may be further strengthened by means of additional slats 9ᵃ. The space between the slats and the base is utilized, as in the modification described above, to contain detached parts 8ª of the scale, and other parts may, if desired, be separately secured to the slats 3ª and 9ª.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. The combination with a packing case base, said base being of relatively rigid construction, of spaced slats, and means secured to said base independently of the walls of said case for supporting the ends only of said slats upon said base.

2. The combination with a packing case base, said base being of relatively rigid construction, of cleats secured to the margins of said base, resilient slats supported by said cleats, and means for securing an article to said slats.

3. The combination with a packing case base, said base being of relatively rigid construction, of cleats secured to the margins of said base, resilient slats supported by said cleats, and means for securing an article to said slats, said means including a transverse member adapted to be secured to said article.

4. The combination with a packing case base, said base being of relatively rigid construction, of cleats secured to the margins of said base, and resilient article-carrying means supported on said cleats.

5. The combination with a packing case base, said base being of relatively rigid construction, of cleats secured to the margins of said base, and resilient slats supported on said cleats.

6. The combination with a packing case base, said base being of relatively rigid construction, of cleats secured to the margins of said base, and resilient slats supported on said cleats, said slats converging from one of said cleats toward the other.

7. In a device of the class described, in combination, a base of relatively rigid construction, and vertically and laterally yieldable slats secured to and supported by said base.

8. In a device of the class described, in combination, a base of relatively rigid construction, cleats secured thereto, and vertically and laterally yieldable slats secured to and supported by said base.

9. In a device of the class described, the combination of a base of relatively rigid construction, and resilient article-carrying members secured to and supported at their ends in spaced relation to said base.

10. In a device of the class described, the combination of a base of relatively rigid construction, and resilient article-carrying slats secured at their ends thereto so as to be spaced therefrom throughout the greater portion of their length.

11. In a device of the class described, the combination of a base, and resilient article-carrying slats secured at their ends thereto so as to be spaced therefrom throughout the greater portion of their length, said slats being arranged in non-parallel relation.

12. In a device of the class described, the combination of a base and resilient article-carrying slats secured at their ends thereto so as to be spaced therefrom throughout the greater portions of their lengths, said slats being arranged in converging relation.

ALBERT NEILS.

Witnesses:
B. O. MARSHALL,
C. E. WILCOX.